US010803387B1

United States Patent
Setty et al.

(10) Patent No.: US 10,803,387 B1
(45) Date of Patent: Oct. 13, 2020

(54) DEEP NEURAL ARCHITECTURES FOR DETECTING FALSE CLAIMS

(71) Applicant: The University of Stavanger, Stavanger (NO)

(72) Inventors: Vinay J. Setty, Stavanger (NO); Rahul Mishra, Hafrsjord (NO)

(73) Assignee: THE UNIVERSITY OF STAVANGER, Stavanger (NO)

( * ) Notice: Subject to any disclaimer, the term of this patent is extended or adjusted under 35 U.S.C. 154(b) by 0 days.

(21) Appl. No.: 16/586,591

(22) Filed: Sep. 27, 2019

(51) Int. Cl.
G06N 3/04 (2006.01)
G06N 3/08 (2006.01)

(52) U.S. Cl.
CPC ............. *G06N 3/08* (2013.01); *G06N 3/0454* (2013.01)

(58) Field of Classification Search
CPC ............................... G06N 3/0454; G06N 3/08
USPC .......................................................... 706/20
See application file for complete search history.

(56) References Cited

U.S. PATENT DOCUMENTS

2018/0365562 A1  12/2018  Volkova et al.
2019/0179956 A1   6/2019  Krasadakis et al.

FOREIGN PATENT DOCUMENTS

| CN | 109471932 A | 3/2019 |
|---|---|---|
| CN | 109492219 A | 3/2019 |
| WO | WO 2019-043379 A1 | 3/2019 |
| WO | WO 2019-050968 A1 | 3/2019 |

OTHER PUBLICATIONS

Singhania et al ("3HAN: A Deep Neural Network for Fake News Detection" 2017). (Year: 2017).*
Singhania et al., "3HAN: A Deep Neural Network for Fake News Detection;" International Institute of Information Technology Bangalore; Nov. 2017; 11 pages.
Allaparthi et al., "Sentiment and Semantic Deep Hierarchical Attention Neural Network for Fine Grained News Classification;" International Institute of Information Technology Hyderabad; Nov. 2018; 9 pages.
Zhang et al., "Fakedetector: Effective Fake News Detection with Deep Diffusive Neural Network;" IFM LAB Florida State University/ BDSC LAB, University of Illinois at Chicago; Aug. 10, 2019; 13 pages.

* cited by examiner

*Primary Examiner* — Lut Wong
(74) *Attorney, Agent, or Firm* — Adsero IP

(57) ABSTRACT

The present disclosure relates to a method and attention neural network for automatically learning embeddings for various latent aspects of textual claims and documents performed in an attention neural network comprising one or more latent aspect models for guiding an attention mechanism of the neural network, wherein the method comprises the steps of inserting a claim document pair, in each of the latent aspect models and a latent aspect vector to select significant sentences to form document representations for each respective latent aspect of the latent aspect vector, concatenating the document representations to establish an overall document representation, calculating a class probability distribution by means of the overall document representation, and classifying the claim of document as true or false using the class probability distribution.

14 Claims, 14 Drawing Sheets

TABLE 1

Claim: *U.S. is "most highly taxed nation in the world"*

| Sentence Attention | | Word Attention |
|---|---|---|
| Author: Donald Trump | | 1. This was well below the UK which raised 36.3 per cent.<br>2. It was below Germany, which raised 45 per cent.<br>3. In fact of the 191 countries covered by the IMF data set the US was only the 71st most taxed country in the world by this metric.<br>4. Once various allowances and deductions are factored in, the effective corporate US rate on firms comes down to 18.6 per cent according to the US Congressional Budget Office. |
| Domain: indepen en.co.uk | | 1. What about indirect taxes, like sales taxes or VAT etc? Again, Trump claim is grossly inaccurate by this this measure.<br>2. The US was actually the bottom of the list of 35 analysed countries.<br>3. this was lower than the rates seen in Japan and the US.<br>4. And as for the idea of the American population as a whole being the most highly-taxed nation on earth that is simply a falsehood. |
| Subject: Taxes | | 1. But was he talking about ▓▓▓ ▓▓ ▓▓ ▓▓ ▓▓ was, this was also a false ▓▓.<br>2. The US share of national income raised from corporate taxes is today considerably lower than in the 1960s and 70s when the US government raised upwards of 2.5 per cent of national income this way.<br>3. it is misleading to suggest that US firms are currently ▓▓▓▓ in a practical sense.<br>4. And as for the idea of the American population as a whole being the most ▓▓▓▓ nation on earth that is simply a falsehood. |

Output of Evidence Extraction

This was well below the UK which raised 36.3 per cent. It was below Germany, which raised 45 per cent. this was lower than the rates seen in Japan and the UK. And as for the idea of the American population as a whole being the most highly-taxed nation on earth that is simply a falsehood. But was he talking about income tax rates? If he was, this was also a false claim.

(a)

| DeClarE: Word attention | 1. ▓▓ national income ▓▓ corp raised by the US government in tax.<br>2. In fact of the 191 countries covered by the IMF data set the US was only the ▓▓ most taxed country in the world by this metric.<br>3. Again, thats well below the 25.8 per cent wedge in the UK, the ▓▓ per cent wedge in Germany and the ▓▓ per cent wedge in ▓▓.<br>4. And as for the idea of the American population as a whole being the most highly-taxed nation on earth that is simply a falsehood. |
|---|---|

TABLE 2.

Claim: *There is substantial evidence of voter fraud.*

| Sentence Attention | Word Attention |
|---|---|
| Author: *Donald Trump* | 1. Documents disprove White House voter fraud claims, says ex-member of Trump commission. <br> 2. A review of documents has shown White House claims to have unearthed substantial evidence of voter fraud were false. |
| Domain: *theguardian.com* | 1. The sections on evidence of voter fraud are glaringly empty. <br> 2. Most voting rights experts view in-person voter fraud as passingly rare. |
| Subject: *Elections* | 1. the country has become pushed back with a one joint statement saying they saw no evidence of it. <br> 2. A review of documents from the commission and released internally by a former member found no evidence of voter fraud. |

Output of Evidence Extraction

Documents disprove White House voter fraud claims, says ex-member of Trump commission.
Most voting rights experts view in-person voter fraud as passingly rare.

(a)

Post hark: Word attention 
1. The sections on evidence of voter fraud are glaringly empty.
2. it expected to find widespread evidence of fraud.

DEEP NEURAL ARCHITECTURES FOR DETECTING FALSE CLAIMS

TECHNICAL FIELD

The present technology relates to a method and an attention neural network for detecting false claims in documents, e.g. published by media.

BACKGROUND

Recently, fake news, i.e. false claims, and misinformation have become rampant in the web, affecting election outcomes, societies and economies.

The unprecedented growth of the Web, online news and social media has led to a paradigm shift in the way people consume information. As a consequence, spread of misinformation or fake news in online medium has been faster and wider than ever before. To counter this several fact checking websites such as snopes.com, poltifact.com and fullfact.org are increasingly becoming popular. These websites have dedicated experts manually classifying the credibility of news articles and claims. However, online news is generated in large volumes and at a high rate which manual verification cannot cope with.

Most existing solutions for automated fake news detection are from the Natural Language Processing (NLP) or Information Retrieval (IR) community and they rely on the linguistic cues from the news articles. However, there is no agreement on specific linguistic features that define fake news by the research community or journalists. Since fake news is mostly written by humans, it can take many forms such as misinformation, rumour, click-bait, satire, or partially true news rendering their detection hard.

Different techniques for detecting and classifying fake news using Deep Neural Networks have been proposed. In reference [1] (see reference list on the last page of the Detailed Description) a deep learning based automated detector through a three level Hierarchical Attention Network (3HAN) is proposed for detection of fake news. 3HAN has three levels, one each for words, sentences, and the headline, and the detector constructs a news vector, which is a representation of an input news article in a hierarchical bottom-up manner.

From reference [2] is known an automatic fake news detector credibility interference model, called FakeDetector. Based on a set of explicit and latent features extracted from the textual information, the FakeDetector builds a deep diffusive network model to learn the representations of news articles, creators and subjects simultaneously.

In ref. [3], it is proposed a deep hierarchical attention neural architecture combining sentiment and semantic embeddings in a model, SSD-HAN, for more fine grained classification of news stories.

SUMMARY

One object of the following disclosure is to provide an improved method for detecting and classifying claims of a document as true or false.

Said object is achieved by a method and an attention neural network wherein latent learned aspect embeddings together with the attention neural network is used for classifying false and true claims in textual format.

According to one aspect of the following disclosure, a method and different embodiments are provided for automatically learning embeddings for one or more latent aspects of textual claims and documents constituting claim document pairs performed in an attention neural network comprising one or more latent aspect models for guiding an attention mechanism of the neural network, wherein the method comprises the steps of inserting a claim document pair, in each of the latent aspect models and a latent aspect vector to select significant sentences to form document representations for each respective latent aspect of the latent aspect vector, concatenating the document representations to establish an overall document representation, calculating a class probability distribution by means of the overall document representation, and classifying the claim of document as true or false using the class probability distribution.

According to another aspect of the following disclosure, an attention neural network and embodiments thereof are provided for automatically learning embeddings for one or more latent aspects of textual claims and documents constituting claim document pairs, the attention neural network comprising one or more latent aspect models for guiding an attention mechanism of the neural network, wherein the attention neural network comprises one or more data processors configured to insert a claim document pair in each of the latent aspect models and a latent aspect vector to select significant sentences to form document representations for each respective latent aspect of the latent aspect vector, concatenate the document representations to establish an overall document representation, calculate a class probability distribution by means of the overall document representation, and classify the claim of document as true or false using the class probability distribution.

By using several manually annotated high quality datasets such as Politick, and Snopes, it has been shown and proved that these learned aspect embeddings have the advantage to be strong predictors of false claims. Latent aspect embeddings learned from attention mechanisms improve the accuracy of false claim detection by up to 13.5% in terms of Macro F1 compared to state-of-the-art solutions. Macro F1 is an evolution measure of accuracy.

BRIEF DESCRIPTION OF THE DRAWINGS

The foregoing, and other, objects, features and advantages of the present invention will be more readily understood upon reading the following detailed description in conjunction with the drawings in which:

FIG. 13 is a table illustrating an example of attention visualization; and

FIG. 14 is another table illustrating yet another example of attention visualization.

DETAILED DESCRIPTION

Figure 1:
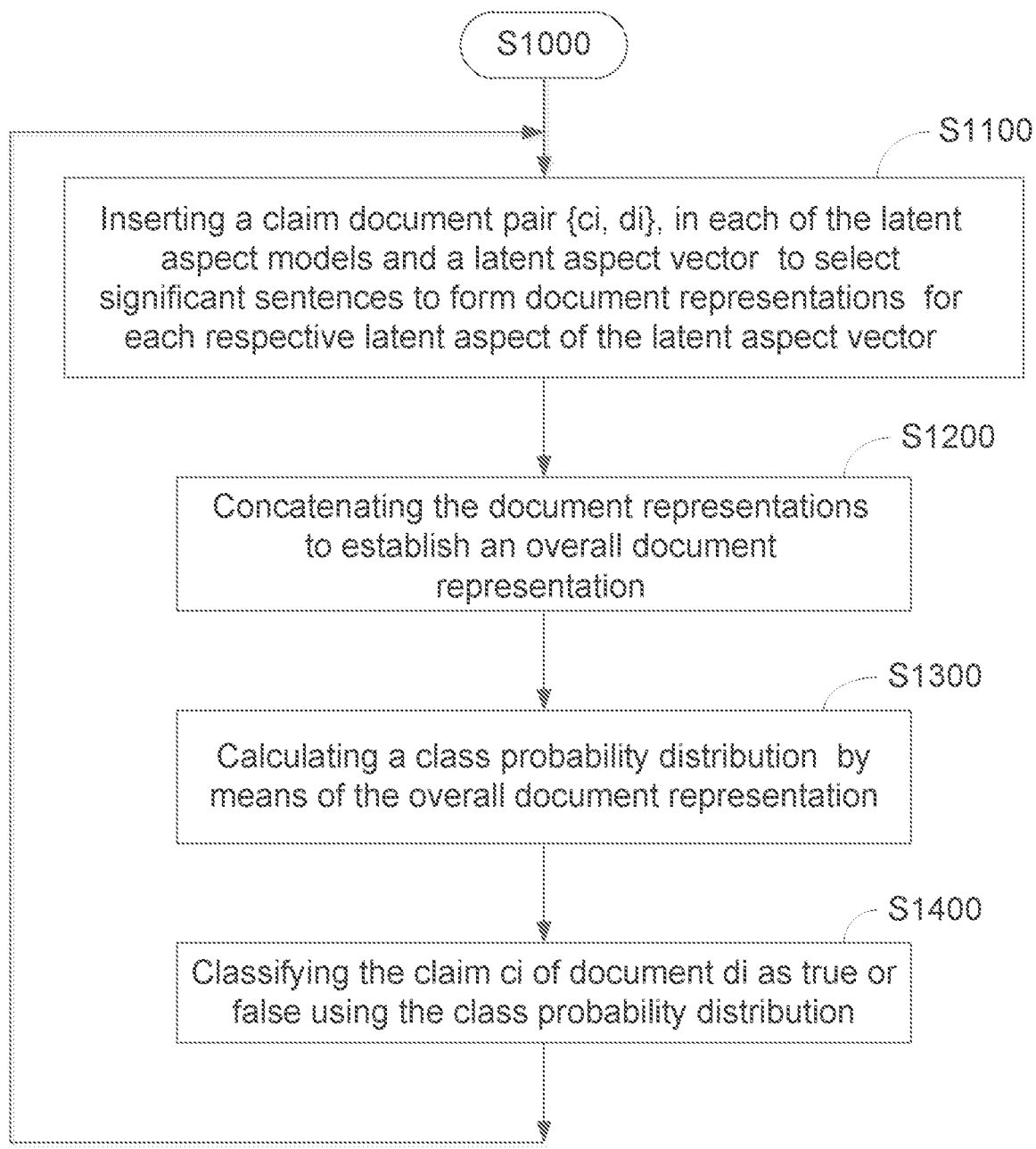
FIG. 1 is a flowchart of the new method for detecting and classifying fake news.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

A claim is herein defined as to state something or assert something without providing the proof or evidence. However, a claim according to said definition should not be mixed up with a patent claim.

The description provides method and attention neural network architecture which can be used to process high volume of content from news media and social media for validating the veracity of facts or claims. Given a claim from a news article, social media message or in natural language text form, automatically provide a confidence value on if this claim is reliable and credible using the patterns recognized by the deep neural network. In addition, the system can automatically provide evidence for the claim's credibility. It is also envisioned various embodiments such as automatic evidence extraction for citations in smart editors.

To address this challenge the method and attention neural network first filters the check worthy claims using a machine learning. Then the core is a method and an attention network enabled to learn embeddings for various latent aspects of claim text and news articles. Contrary to existing solutions which only apply word-level self-attention, the model jointly learns the latent aspect embeddings for classifying false claims by applying hierarchical attention.

Extracts of evidence (textual snippets) from the external articles which supports or disproves the claims and visualizes them may also be provided according to embodiments of the disclosed method and the attention neural network.

At a high level, Given a claim c E C in textual form, and a set of m candidate relevant documents $D=\{d_1, \ldots, d_m\}$ retrieved form the web as evidence from different domains, the goal is to classify the claim as either "True" or "False" using a deep neural network.

It is therefore herein provided a method and attention neural network architecture, which is illustrated in the enclosed drawings.

It is further provided an embodiment which presents evidence for the veracity of a claim by automatically extracting the supporting evidence.

In order to effectively use external evidence for fake news detection, determining its credibility in the context of given claim and its author, source, is also essential. For understanding the context and credibility of the evidence, it is required learning indicative and salient vocabulary, writing style, sentence structures specific to the latent aspects of the news. The attention due to latent aspects is able to capture the necessary patterns to check if the external evidence supports or refutes the claim. The task is more commonly known as entailment. The dictionary definition of "latent" is hidden or concealed aspects are aspects. So what is meant herein by latent aspects the different aspects of the news claims which are either explicitly known or hidden. If it is like author, subject and domain they are known but our method can generalize to hidden aspects which are not directly known can be interpreted by humans. Note that the latent aspect embeddings are not limited to subject (politics, economics, society, etc.), source (different authors, speakers, etc.) and domain (newspaper, facebook, twitter, etc.) aspects but they are general purpose and can be used for any latent aspects which are relevant for the task.

The proposed method and network architecture jointly learns embeddings for different latent aspects of news using a hierarchical attention mechanism. Intuitively, the attention mechanism learns a unique global representation, embedding, for each of the latent aspects. These embeddings capture the necessary textual patterns needed for distinguishing a claim for being true or false. Similarly, embeddings representing each of the latent aspects capture the necessary patterns from the representative relevant articles to distinguish the veracity of a claim. The attention mechanism guides the neural network which parts of the text to look at when the neural network is learning to predict something. Normally the attention is guided by the expected correct prediction, in this case the neural network is guided to which words and sentences pay attention to using latent aspects, which is not done by any of the existing methods.

For automatically extract and present the supporting evidence, the proposed method and network architecture fuses the word level and sentence level attention weights guided by various latent aspect embeddings (e.g. subject, source, domain) to extract evidence snippets. Those snippets are more informative and since they are chosen at the sentence level these are easy to interpret for the users.

FIG. 1 is a flowchart comprising the steps of the proposed method S1000 for detecting and classifying false and true claims or statements. FIG. 1 shows a neural network algorithmic flow which takes document and claim pairs as input along with the aspect metadata associated with the claim, e.g. author, subject, domain or any other aspects, and returns the decision if the claim is true or false. The decision is based on the overall score of said latent aspects.

The method S1000 may be performed in a deep hierarchical attention neural network for automatically learning embeddings for various latent aspects of textual claims and relevant documents. Documents can be news articles, Wikipedia pages, blogs, press releases etc, which can be presented in an electronic form or format.

The method S1000 makes use of one or more latent aspect models for guiding an attention mechanism enabling guided attention both at word-level as well as sentence-level.

The method S1000 comprises following steps:

S1100:—Inserting a claim document pair $\{c_i, d_i\}$, in each of the latent aspect models and a latent aspect vector $\vec{A}$ to select significant sentences to form document representations D for each respective latent aspect of the latent aspect vector $\vec{A}$;

S1200:—Concatenating the document representations D to establish an overall document representation $D_{all}$;

S1300:—Calculating a class probability distribution $P_{bin}$ by means of the overall document representation $D_{all}$;

S1400:—Classifying the claim $c_i$ of document $d_i$ as true or false using the class probability distribution $P_{bin}$.

The attention neural network preferably comprises an input layer in terms of claim document pair $\{c_i, d_i\}$, comprising pre-trained words to provide for each claim and document pair a concatenated word embeddings sequence. Each of the aspect models is configured to receive a claim document pair $\{c_i, d_i\}$ and a latent aspect vector $\vec{A}$ comprising respective latent aspects.

Figure 2:
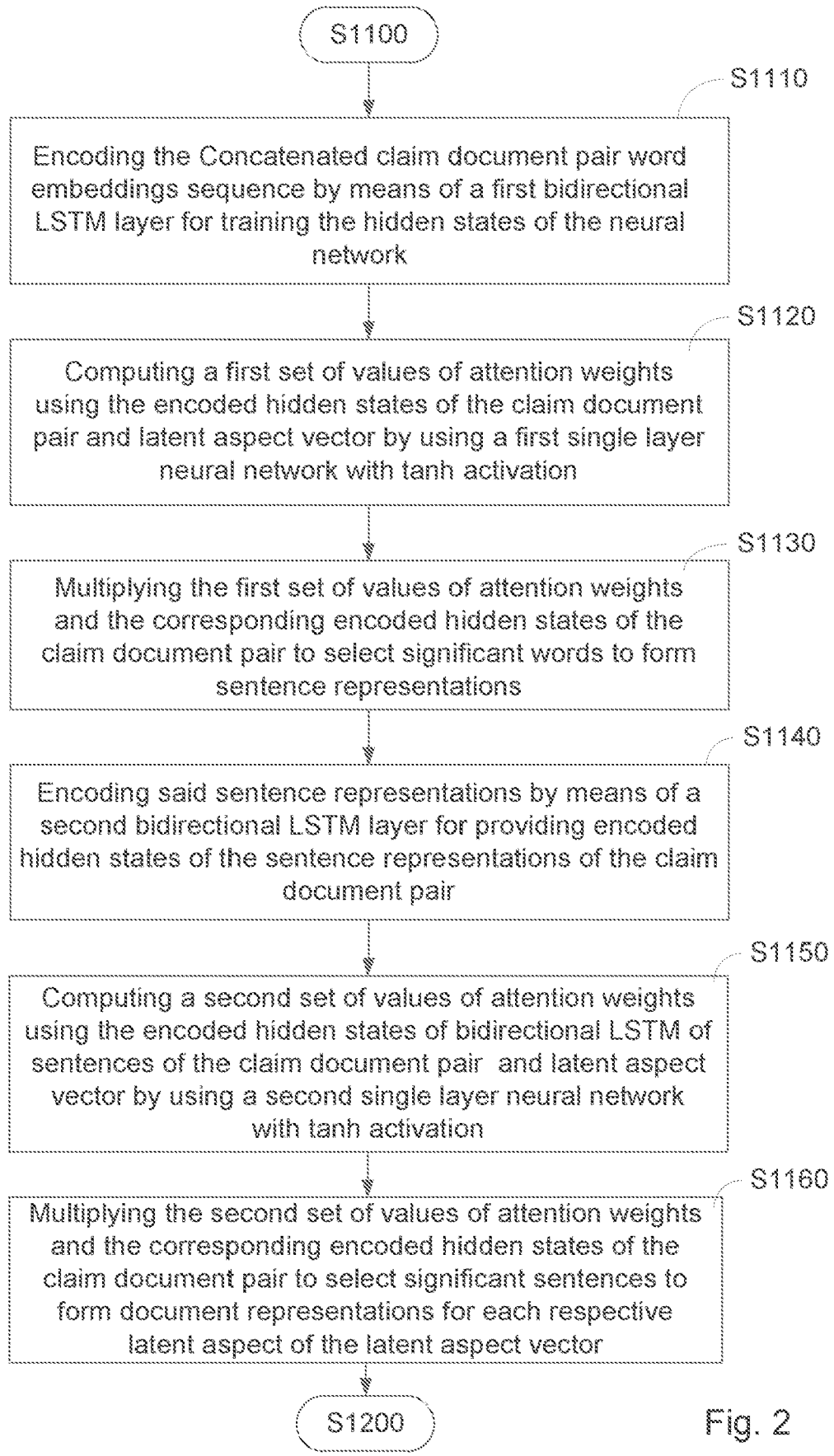
FIG. 2 is a flowchart of an inserting step of the method.

FIG. 2 is a flowchart of the inserting step S1100 of the method S1000 presenting the step in more detail. FIG. 2 shows a flowchart for the process of taking document claim pairs along with the latent aspect vectors associated with the claim and computing the attention weights. These attention weights are computed both at word level as well as sentence level.

Each embedded claim $c_i$ is concatenated, i.e. linked, with the corresponding embedded document dj, which is denoted as $\{c_i, d_i\}$. Each $\{c_i, d_i\}$ pair consists of n sentences of length l, which is depicted as word sequence w11 to wnl.

According to this embodiment, the inserting step S1100 may include the following steps of:

S1110:—Encoding the concatenated claim document pair $\{c_i, d_i\}$ word embeddings sequence by means of a first bidirectional LSTM layer for training the hidden states of the neural network;

S1120:—Computing a first set of values of attention weights $\alpha_{11}, \ldots, \alpha_{nl}$ using the encoded hidden states of the claim document pair $\{c_i, d_i\}$ and latent aspect vector $\vec{A}$ by using a first single layer neural network with tanh activation;

S1130:—Multiplying the first set of values of attention weights $\alpha_{11}, \ldots, \alpha_{nl}$ and the corresponding encoded hidden states of the claim document pair $\{c_i, d_i\}$ to select significant words to form sentence representations $S^1, \ldots, S^n$;

S1140:—Encoding said sentence representations $S^1, \ldots, S^n$ by means of a second bidirectional LSTM layer for providing encoded hidden states of the sentence representations $S^1, \ldots, S^n$ of the claim document pair $\{c_i, d_i\}$;

S1150:—Computing a second set of values of attention weights $\beta_1, \ldots, \beta_n$ using the encoded hidden states of bidirectional LSTM of sentences $S^1, \ldots, S^n$ of the claim document pair $\{c_i, d_i\}$ and latent aspect vector $\vec{A}$ by using a second single layer neural network with tanh activation;

S1160:—Multiplying the second set of values of attention weights $\beta_1, \ldots, \beta_n$ and the corresponding encoded hidden states of the claim document pair $\{c_i, d_i\}$ to select significant sentences to form document representations D for each respective latent aspect of the latent aspect vector $\vec{A}$.

The steps S1110 to S1160 constitutes the attention mechanism.

Figure 3:
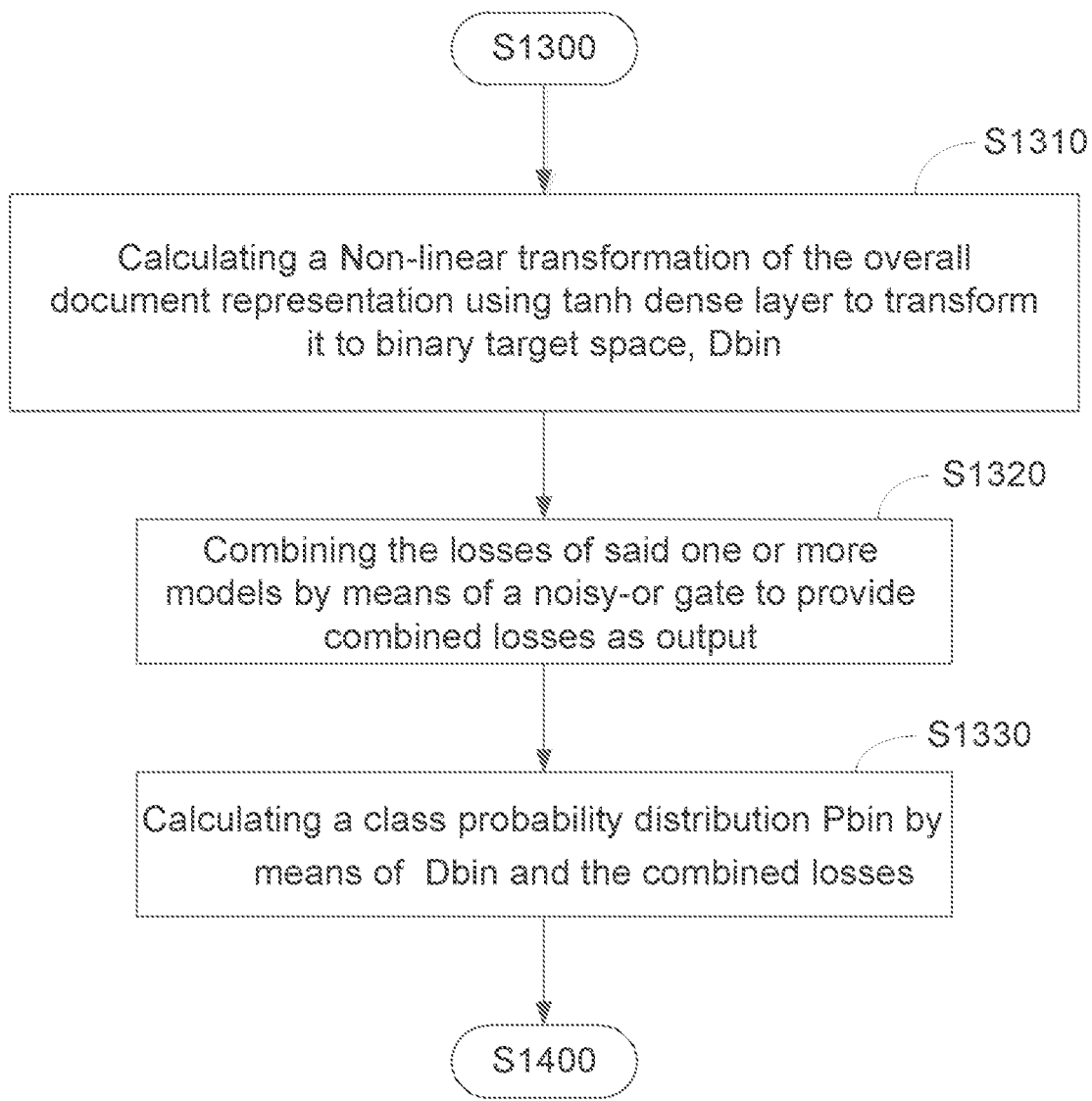
FIG. 3 is a flowchart of a calculating step of the method.

FIG. 3 is a flowchart of the calculating step S1300 of the method S1000 presenting the step in more detail.

FIG. 3 depicts the flowchart describing the process of computing the overall score of the document representation w.r.t each of the aspects and finally computing the probability distribution of being true or false for the given input claim. According to this embodiment, the calculating step S1300 may include the following steps of:

S1310:—Calculating a Non-linear transformation of the overall document representation $D_{all}$ using tanh dense layer to transform it, $D_{all}$, to binary target space, $D_{bin}$.

A dense layer consists of all to all connections from one layer of neural network to another. It is also called as fully connected layer.

According to one embodiment of the method S1000, $D_{bin}$ may be calculated as $D_{bin}=\tanh(W_{bin}D_{all}+b_{bin})$ where $W_{bin}$ and $b_{bin}$ are the weights matrix and bias for dense layer. The method step S1300 also comprises the steps:

S1320:—Combining the losses of said one or more models by means of a noisy-or gate to provide combined losses as output;

S1330:—Calculating a class probability distribution $P_{bin}$ by means of $D_{bin}$ and the combined losses using a softmax layer.

According to one embodiment of the method S1000, $P_{bin}$ may be calculated as $P_{bin}=\text{softmax}(D_{bin})$ using the softmax layer.

Figure 4:
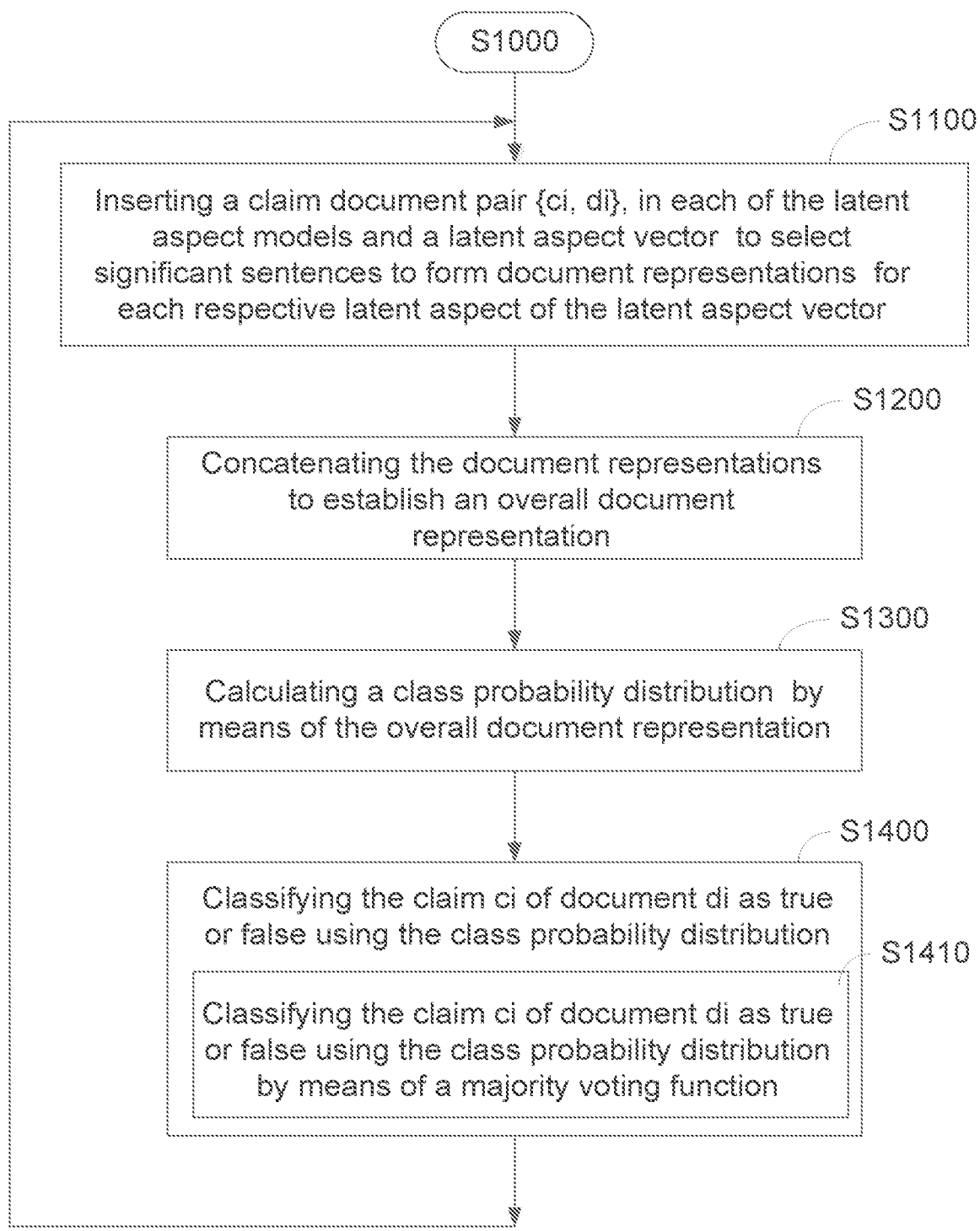
FIG. 4 is a flowchart of yet an embodiment of the method.

FIG. 4 is a flowchart of an embodiment of the method S1000 wherein the classifying step S1400 may include the following step of:

S1410:—Classifying the claim $c_i$ of document $d_i$ as true or false using a majority voting function.

Figure 5:
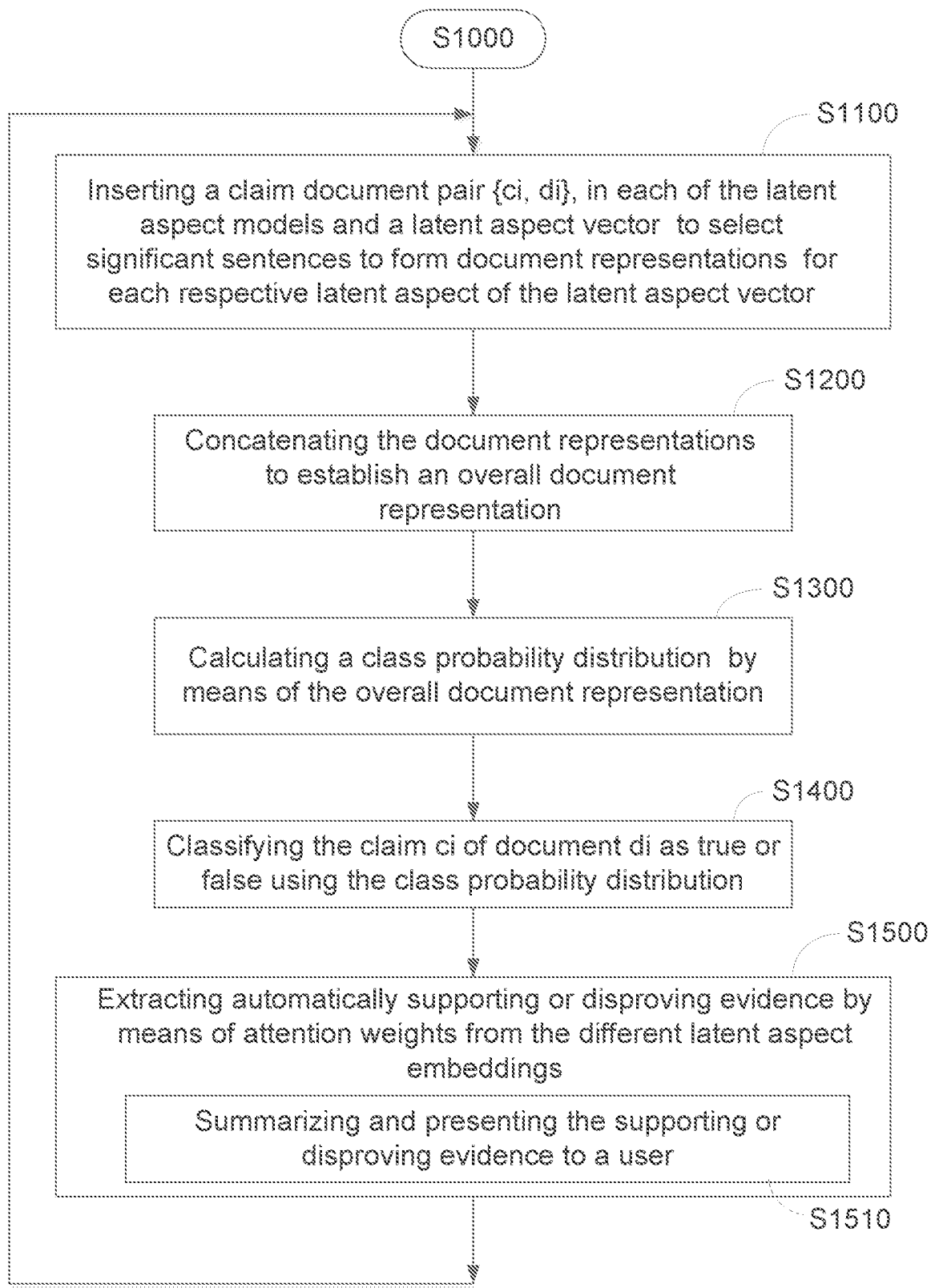
FIG. 5 is a flowchart of further one embodiment of the method.

FIG. 5 is a flowchart of an embodiment of the method S1000 comprising an extracting step S1500 for extracting and providing supporting or disproving evidence, text snippets, to a user:

S1500:—Extracting automatically supporting or disproving evidence by means of attention weights from the different latent aspect embeddings.

The step of extracting, S1500, supporting or disproving evidence may further comprise the step of:

S1510:—Summarizing and presenting the supporting or disproving evidence to a user.

The above described method S1000, its steps and embodiments are further explained in detail hereafter and hopefully better understood in connection with the following description of the implementation of the method.

Figure 6:
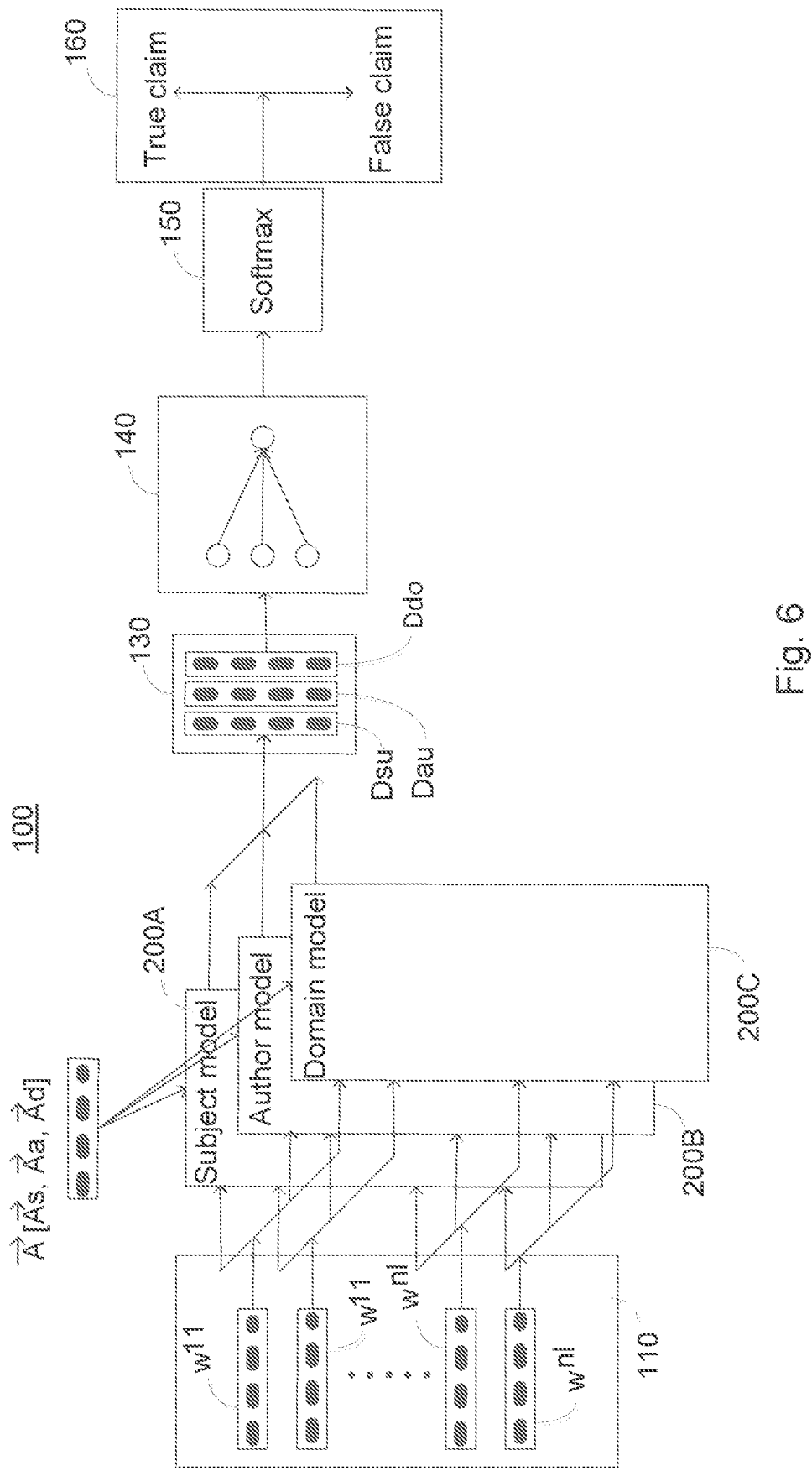
FIG. 6 is a block diagram of a high-level attention architecture of the attention neural network.
Figure 7:
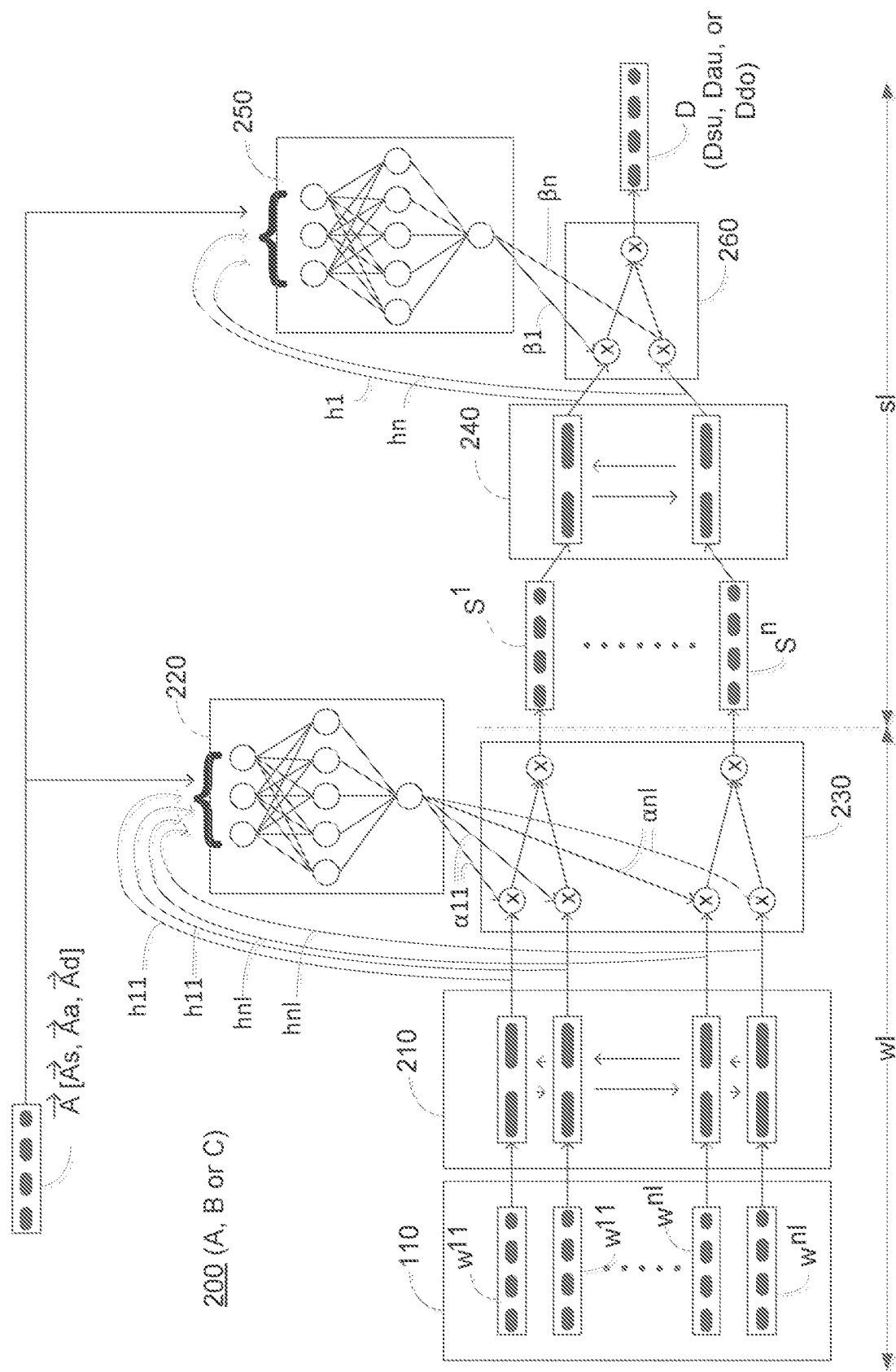
FIG. 7 is a block diagram of an attention mechanism of a latent aspect model of the high-level architecture.

The entities and units being described with reference to FIGS. 6 and 7 are logical units, and do not necessarily correspond to separate physical units. Thus, the person skilled in the art would appreciate that the units disclosed in the FIGS. 6 and 7 may be implemented as physically integrated units, and/or physically separate units, and that the units are provided with appropriate processing circuits.

The overall architecture 100 of the system/computer network architecture is depicted in FIG. 6.

The high-level deep neural network architecture comprises a number of function blocks 110, 200A, 200B, 200C, 130, 140, 150 and 160.

FIG. 6 shows a high-level deep neural network architecture of the proposed method which jointly learns subject, author and domain embeddings in parallel by applying hierarchical attention at word level as well as sentence level. Given a training dataset of claims with their ground-truth labels, the object is to learn a model based on the evidence from the relevant web documents D. To address the two challenges, (1) an hierarchical Bi-LSTM model is used to capture the word-level and sentence-level structure of the documents, and (2), an attention mechanism, which uses both claim text and a latent aspect vector $\vec{A}$, sometimes also denoted as latent aspect attribute vector, to compute the attention, is then used to learn the embedding weights of the latent aspects. Latent aspect vectors are numerical representation of individual measurable properties of a given claim. A d-dimensional vector refers to an arrow in a d-dimensional plane. Each claim would have unique arrows in this d-dimensional plane. Each of the latent aspects of each of the claims can be represented as set of numbers of size d in Euclidean space.

The latent vector is a d-dimensional (d=100 for example) real valued vector. Each latent aspect has a corresponding vector for each item in that aspect. For example, for author aspect there will be one vector for Donald Trump, one for Bernie Sanders etc for every author known to us and a dummy vector representing everyone else. These vectors are initialised uniformly randomly at the beginning. As the the neural network training proceeds, for a training input data with claim, document pair with a known author/subject/domain the vectors of corresponding author/subject/domain aspects is updated continuously. Finally when the training stops the values of these vectors is what gives the latent aspect embeddings.

The intuition behind this design is that each of the latent aspect models jointly guides the attention to vocabulary and the sentences relevant for classifying claims. It has been shown in experiments that the architecture 100 learns an effective model to identify complex patterns of false claims. For this purpose, the architecture 100 has different parallel models 200, one for each of the latent aspects. The detailed architecture of these models 200 is shown in FIG. 7. Specifically, Subject, Author and Domain aspects is considered in the example of FIG. 6, but it is generalizable to any additional aspects of the claims and documents.

Subject Model 200A: The words which are significant for specific subject, can be used in various ways by different authors in claim and by different columnist or journalist in articles related to claims. Therefore subject attention at the word level tries to learn and attend these words and at the sentence level tries to capture significant sentence formations used for the specific subject to accomplish a subject representation Dsu.

Author Model 200B: Similar to subject model, but author guided aspect attention is used at word level to select author related words used in articles and sentence representations are learned by aggregating these words. Author guided aspect attention is used at the sentence level to select author specific sentence formations or popular phrases which frequently used for specific author and document representation Dau is accomplished by aggregating these selected sentences.

Domain Model 200C: Different domains in the web search results may have unique way of writing articles like selection of words and sentence formation as whole. In similar fashion to subject and author aspect attention, and for attending different domains differently and to learn latent patterns, domain guided aspect attention at both the word and sentence level is applied, which results in document representation Ddo.

At a high level, an attention neural network 100 for automatically learning embeddings for various latent aspects of textual claims and documents, the attention neural network comprising one or more latent aspect models 200 for guiding an attention mechanism of the said neural network, wherein the attention neural network 100 comprises one or more data processors configured to perform the steps of the method S1000.

Each claim document pair $\{c_i, d_i\}$, is passed as the input to each of the three models 200A, 200B, 200C, along with respective latent aspects stored in an aspect vector $\vec{A}$, i.e. in accordance with step S1100, a claim document pair $\{c_i, d_i\}$, in each of the latent aspect models and a latent aspect vector $\vec{A}$ are inserted to select significant sentences to form document representations D for each respective latent aspect of the latent aspect vector $\vec{A}$. The latent aspects are stored in the memory of General Processing Unit chips installed on a computer.

In the next step, S1200, the outputs of these models are concatenated, i.e. linked, in a block 130 by concatenating the document representations D to establish an overall document representation $D_{all}$.

Losses of all three models are computed and aggregated using a noisy-or function 140. Losses are computed using a function which takes expect correct prediction and the actual prediction by the neural network as inputs.

In the following step, S1300, the result is passed to a fully connected softmax layer 150 for calculating a probability prediction or a classification prediction $P_{bin}$ by means of the overall document representation $D_{all}$. Softmax is the well-known mathematical formula.

Finally, step S1400 is performed by block 160 wherein the claim $c_i$ of document $d_1$ is classified as true or false using the class probability prediction $P_{bin}$. $P_{bin}$ is a probability distribution value which indicates whether the claim is false or true based on the relevant documents. This is the output of the neural network. Softmax is a function which can take the output of neural network and transform it into a probability value. For example it can output <0.8,0.2> which implies the claim is true with probability 0.8 and false with probability 0.2.

Since the models operate on claim-document pair $\{c_i, d_i\}$, the classification of the claim $c_1$ may be performed in block or layer 160 by a majority voting function of outcomes corresponding to each of the $\{c_i, d_i\}$ pairs.

In FIG. 7 is illustrated an embodiment of a hierarchical attention architecture of a latent aspect model 200 of the high-level architecture 100. FIG. 7 elaborates the attention mechanism and depicts the mechanism in which attention weights at word and sentence level are computed using the latent aspect vectors which are jointly trained together with the rest of the neural network.

The Latent Aspect Attention used herein may be explained in the following way. Different authors, while making claims on different subjects, tend to have different styles of speech and selection of words. Similarly, writers and journalists from different domains may have unique style and vocabulary while writing about claims from a specific author and a specific subject. It is an extremely difficult task to curate the salient vocabulary and sentence structures for these complex combina-tions. Therefore, the task is automated by using an attention mechanism which in turn helps in capturing entailment and sentiments necessary to classify the claim. For example, in tweets by Donald Trump words like "great", "democrats" and "obama" are normally mentioned in specific context and sentiments, which the attention mechanism is able to capture.

Each claim and document pair $\{c_i, d_i\}$ is associated with a subject vector $\vec{A}_s$, author vector $\vec{A}_a$ and domain vector $\vec{A}_d$. These aspect vectors are used in addition to claim text to learn attention weights applied to hidden states at both word level wl and sentence level sl.

In an embedding layer 110, pre-trained GloVe word embeddings may be used to get representations for each claim and document pair. GloVe is well-known in the technical field of machine learning and GloVe refers to a specific distributed representation of words in the text. Trainable embeddings, e.g. claim word and document word embeddings, are used for subject, author and domain attributes of 100 dimensions each in size and initialize with uniformly random weights to get the representation of latent attributes in vector space. Weights are learned for these embeddings jointly in the model using corresponding hierarchical subject, author and domain attentions from their respective models as shown in FIG. 7. The attention mechanism comprises the blocks 210, 220, 230, 240, 250 and 260 of the block diagram FIG. 7. The function of said blocks will in the following be described in more detail.

Each embedded claim $c_i$ is concatenated, i.e. linked, with the corresponding embedded document dj, which is denoted as $\{c_i, d_i\}$. Each $\{c_i, d_i\}$ pair consists of n sentences of length l, which is depicted as word sequence w11 to wnl. Step S1100 comprises step S1110:—Encoding the concatenated claim document pair $\{c_i, d_i\}$ word embeddings sequence by means of a first bidirectional LSTM layer for training the hidden states of the neural network.

As sequence encoder a Long Short Term Memory (LSTM) may be used to encode the input sequence. The concatenated word embeddings of claim and document pair $\{c_i, d_i\}$ are passed on to a Bi-directional LSTM layer 210 comprising separate Bi-LSTM units which is used as word encoders.

In formal notations, in all three models, sentence representation S after word sequence encoding by the Bi-LSTM layer 210 is the weighted sum of the hidden states of words multiplied by attention weights. The arrows imply sequence output from one hidden unit is passed on as input to next hidden unit.

Similarly document representation D is the weighted sum of hidden states of sentences multiplied by attention weights, where $h_{ij}$ is the hidden state for the jth word and ith sentence, while $\alpha_{ij}$ is the attention weight. $h_i$ is the hidden state for ith sentence and $\beta_i$ is the attention weight.

Long short term memory (LSTM) is used to encode the input sequence. The outputs from these Bi-LSTM units of the layer 210 are concatenations of forward and backward hidden states for each word.

$$LSTM: h_t^{l-1}, h_{t-1}^l, c_{t-1}^l, \rightarrow h_t^l, c_t^l$$

$$\begin{pmatrix} i \\ f \\ o \\ g \end{pmatrix} = \begin{pmatrix} sigm \\ sigm \\ sigm \\ tanh \end{pmatrix} T_{2n,4n} \begin{pmatrix} h_t^{l-1} \\ h_{t-1}^l \end{pmatrix}$$

$$c_t^l = f \odot c_{t-1}^l + i \odot g$$

$$h_t^l = o \odot \tanh(c_t^l)$$

In these equations, sigm and tanh are applied elementwise. The i, f, o and g are standard notations for LSTM neural networks but we can mention that i is input, f is forget, o is output and g is gate gates.

In the next step, S1120, a first set of values of attention weights $\alpha_{11}, \ldots, \alpha_{nl}$ is computed using the encoded hidden states of the claim document pair $\{(c, d_i\}$ and latent aspect vector $\vec{A}$ by using a first single layer neural network with tanh activation. $\vec{A}$ is the latent aspect vector, which is equal to subject vector $\vec{A}_s$ in subject model 200A, author vector $\vec{A}_a$ in author model 200B and domain vector $\vec{A}_d$ in case of domain model 200C.

In formal notations, in all three models 200, sentence representation Si after word sequence encoding by the Bi-LSTM in the weighted sum of the hidden states of words multiplied by attention weights. These can be defined as:

$$S^i = \sum_{j=1}^{t_i} \alpha_{ij} h_{ij} \text{ and } D = \sum_{i=1}^{n} \beta_i h_i$$

$h_{ij}$ is the hidden state for the $i^{th}$ word of the $j^{th}$ sentence. $\alpha_{ij}$ is the attention weight. $h_i$ is the hidden state for the $i^{th}$ sentence and $\beta_i$ is the attention weight.

$\alpha_{ij}$ and $\beta_i$ can be defined as:

$$\alpha_{ij} = \frac{\exp(e(h_{ij}, \vec{A}))}{\sum_{k=1}^{t_i} \exp(e(h_{ik}, \vec{A}))} \text{ and } \beta_i = \frac{\exp(e(h_i, \vec{A}))}{\sum_{k=1}^{n} \exp(e(h_k, \vec{A}))}$$

Where e is a tanh based scoring function which decides weights for significant words at the word level attention and for significant sentences at sentence level attention. $\vec{A}$ is the latent aspect vector. Said vector may comprise different aspect component vectors. As an example, A may be equal to subject vector $\vec{A}_s$ in the subject model, author vector $\vec{A}_a$ in author model and domain vector $\vec{A}_d$ in case of a domain model. $e(h_{ij}, \vec{A})$ and $e(h_i, \vec{A})$ can be defined as $$e(h_{ij}, \vec{A}) = (v_w)^T \tanh(W_{wh} h_{ij} + W_{wA} \vec{A} + b_w)$$

$$e(h_i, \vec{A}) = (v_s)^T \tanh(W_{sh} h_i + W_{sA} \vec{A} + b_s)$$

Where $v_w$ is a weight vector at the word level and $v_s$ is a weight vector at the sentence level. $W_{wh}$ and $W_{wA}$ are the weight matrices for hidden state and aspect vector and $b_w$ is bias at the word level respectively. $W_{sh}$ and $W_{sA}$ are the weight matrices for hidden state and aspect vector and $b_s$ is bias at the sentence level respectively.

The model 200 of the neural network computes values of attention weights $\alpha_{11}$ to $\alpha_{nl}$ by using single layer neural net with tanh activation, block 220, which uses encoded hidden states of claim document pair and aspect attribute vector $\vec{A}$ as input.

These attention weights $\alpha_{11}$ to $\alpha_{nl}$ are then multiplied in a multiplication layer 230 with corresponding hidden states to select significant words, which are used to form sentence representations as S1 to Sn, in accordance with step S1130:

Multiplying the first set of values of attention weights $\alpha_{11}, \ldots, \alpha_{nl}$ and the corresponding encoded hidden states of the claim document pair $\{c_i, d_i\}$ to select significant words to form sentence representations $S^1, \ldots, S^n$;

These sentence representations are then processed by another Bi-LSTM layer 240 comprising Bi-LSTM units, which outputs hidden states $h_1$ to $h_n$ for each sentence, as performed in step S1140:

Encoding said sentence representations $S^1, \ldots, S^n$ by means of a second bidirectional LSTM layer for providing encoded hidden states of the sentence representations $S^1, \ldots, S^n$ of the claim document pair $\{c_i, d_i\}$.

In accordance with step S1150, values of attention weights $\beta_1$ to $\beta_n$ are then computed by using another single layer neural net with tanh activation 250, which uses hidden states of sentences and latent aspect vector $\vec{A}$ as input, i.e. a second set of values of attention weights $\beta_1, \ldots, \beta_n$ is computed using the encoded hidden states of bidirectional LSTM of sentences $S^1, \ldots, S^n$ of the claim document pair $\{c_i, d_i\}$ and latent aspect vector $\vec{A}$ by using a second single layer neural network with tanh activation.

These attention weights $\beta_1$ to $\beta_n$ are then multiplied in multiplication layer 260 with corresponding hidden states of sentences to select significant sentences, which are used to form document representation as $D_{sb}/D_{au}/D_{do}$ in case of subject, author or domain models correspondingly. This is stated in S1160 as:

Multiplying the second set of values of attention weights $\beta_1, \ldots, \beta_n$ and the corresponding encoded hidden states of the claim document pair $\{c_i, d_i\}$ to select significant sentences to form document representations D for each respective latent aspect of the latent aspect vector $\vec{A}$.

As illustrated in FIG. 6, the attention neural network 100 concatenates in layer 130 the representations for each document D learned from all three models as $D_{sb}$ from subject model, $D_{au}$ from author model and $D_{do}$ from domain model. These three representations are concatenated for the same document and form an overall representation. $D_{sad} = D_{sb} \oplus D_{au} \oplus D_{do}$ $(=D_{all})$ or as stated in step S1200:

Concatenating the document representations D to establish an overall document representation $D_{all}$.

In block 140, the losses for overall merged model, subject model 200A, author model 200B and domain model 200D respectively are calculated:

$$\text{Loss} = 1 - ((1 - \text{loss}_o)) * (1 - \text{loss}_s) * (1 - \text{loss}_a) * (1 - \text{loss}_d)),$$

where $\text{loss}_o$, $\text{loss}_s$, $\text{loss}_a$ and $\text{loss}_d$ are the losses for the overall merged model, subject model, author model and domain model respectively. Any neural network training is essentially adjusting the weights of the nodes (neurons) for minimising loss values which is defined in as a loss function in terms of input data and expected output, and therefore the losses are minimised jointly. This is achieved by using e.g. a noisy-or gate. Softmax cross entropy with logits is used as the loss function in this case. The losses of all three models are combined with the noisy-or gate 140.

Thereafter, a softmax layer 150 is applied to obtain the predictions for each class $P_{bin}$ as $P_{bin} = \text{softmax}(D_{bin})$ according to the following steps.

In step, S1310, a class probability distribution $P_{bin}$ is calculated by means of the overall document representation $D_{all}$.

S1310:—Calculating a Non-linear transformation of the overall document representation $D_{all}$ using tanh dense layer to transform it $(D_{all})$ to binary target space, $D_{bin}$.

$D_{bin}$ may be calculated as $D_{bin} = \tanh(W_{bin} D_{all} + b_{bin})$ where $W_{bin}$ and $b_{bin}$ are the weights matrix and bias for dense layer. A dense layer consists of all to all connections from one layer of neural network to another. It is also called as fully connected layer. Every neural network has weight and bias matrices which are multiplied with input data and passed on to the next layer of the neural network which has its own weight matrix and bias matrices which are multiplied again and again.

The method step S1300 also comprises the steps:

S1320:—Combining the losses of said one or more models by means of a noisy-or gate to provide combined losses as output;

S1330:—Calculating a class probability distribution $P_{bin}$ by means of $D_{bin}$ and the combined losses using a softmax layer.

Finally, step S1400 is performed by block 160 wherein the claim $c_i$ of document $d_i$ is classified as true or false using the probability prediction $P_{bin}$:

S1400:—Classifying the claim $c_i$ of document $d_i$ as true or false using the class probability distribution $P_{bin}$.

Since the models operate on claim-document pair, the classification of the claim $c_i$ may be done by the majority voting 160 of outcomes corresponding to each of the $\{c; d\}$ pairs, i.e. S1410:

Classifying the claim $c_i$ of document $d_i$ as true or false using a majority voting function.

Regarding prediction per claim, the prediction outcomes for a claim c paired with each corresponding documents $\{d_1, \ldots, d_m\}$ are then aggregated by majority voting to assign a class to the claim.

$$\hat{y} = \text{mode}\{y_1, y_2, \ldots, y_m\}$$

Where $\hat{y}$ is the final predicted label, i.e. true or false, for a claim c and $y_1, y_2, \ldots, y_m$ are the predictions for pairs of claim c and corresponding m documents.

Figure 8:
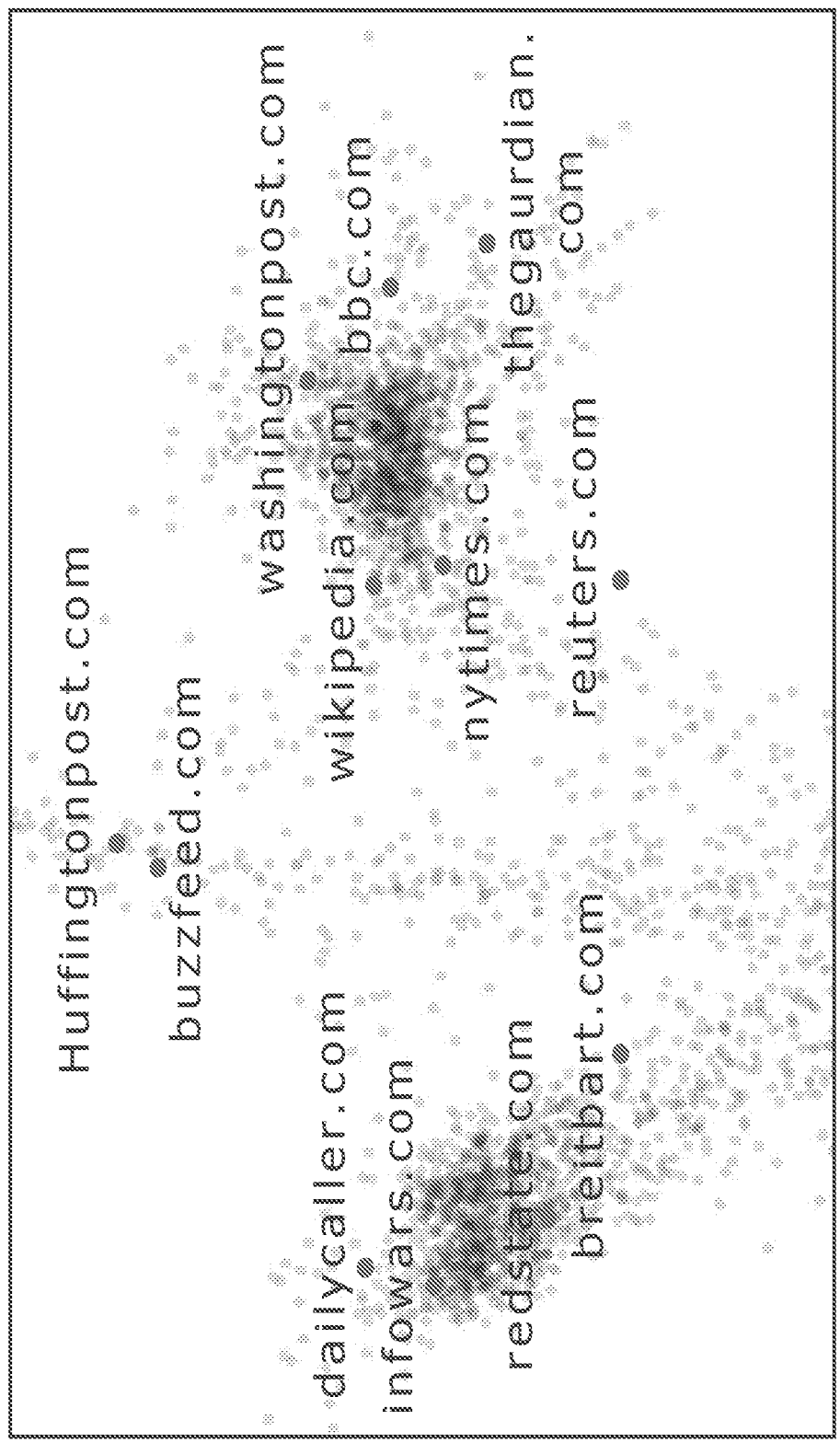
FIG. 8 is a first diagram illustrating a result of the method executed by the attention neural network.
Figure 9:
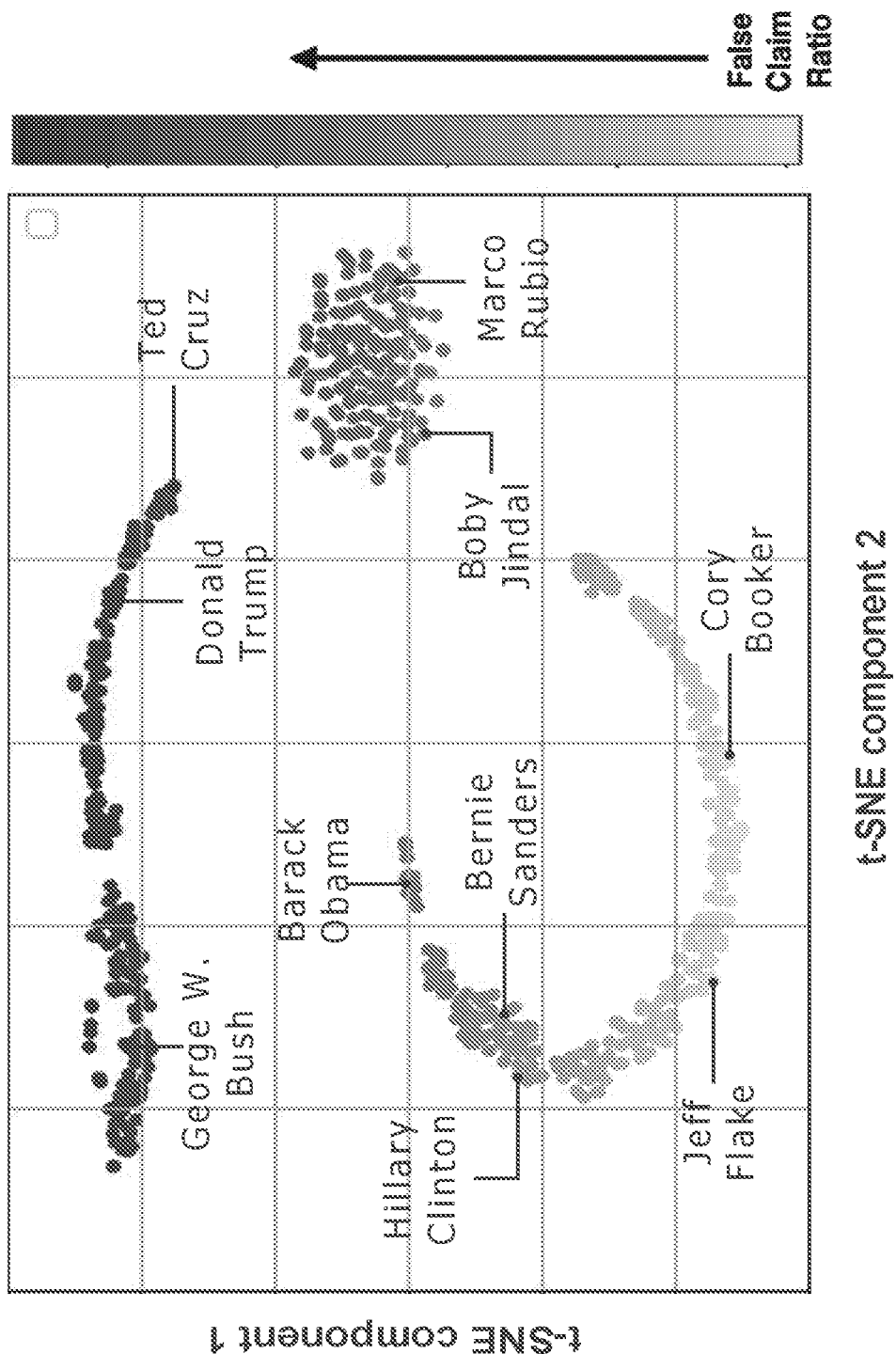
FIG. 9 is a second diagram illustrating another result of the method executed by the attention neural network.
Figure 10:
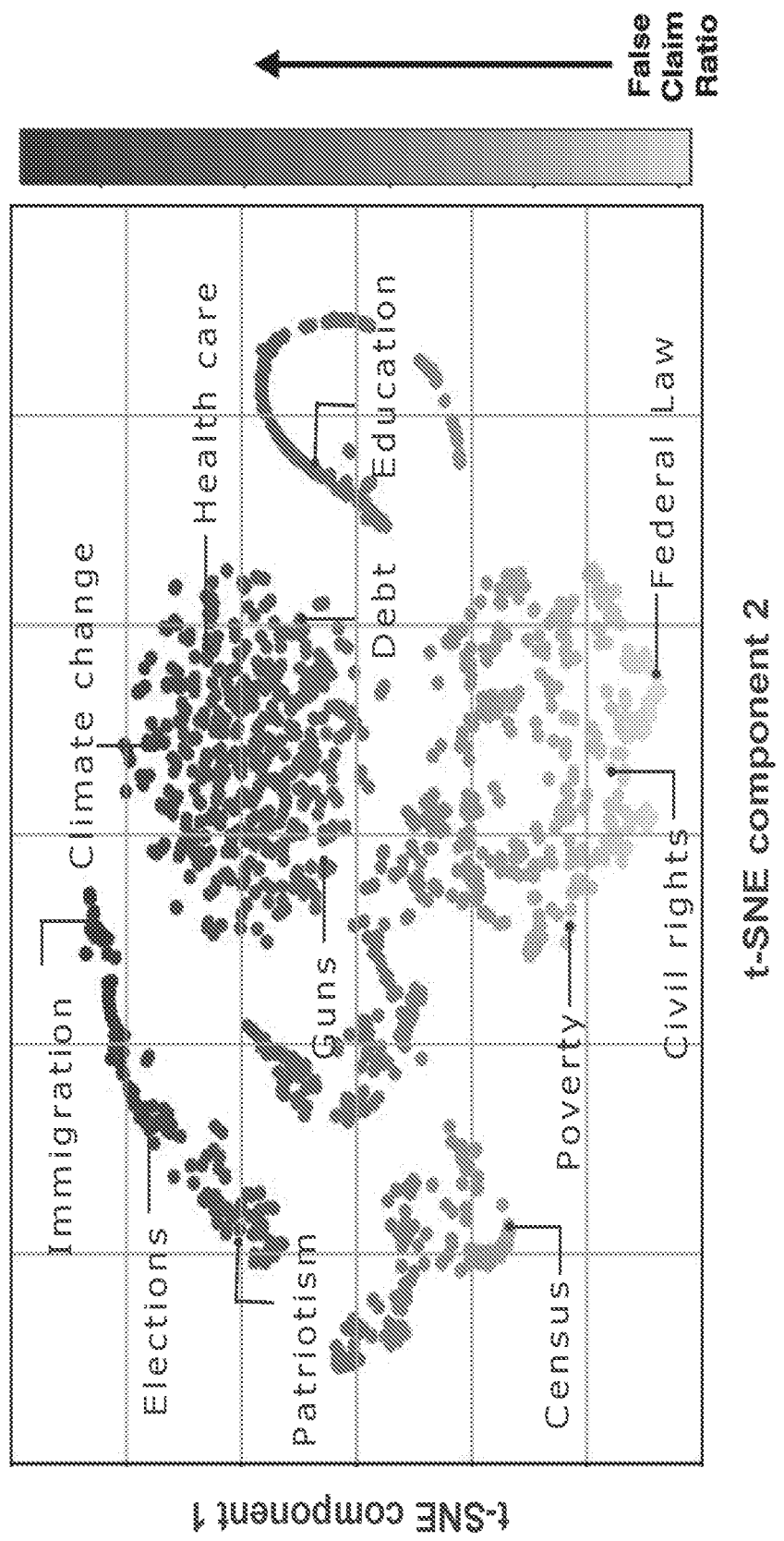
FIG. 10 is a third diagram illustrating yet another result of the method executed by the attention neural network.

FIGS. 8, 9 and 10 are diagrams illustrating different results of the method.

In the figures, t-Distributed Stochastic Neighbor Embedding, t-SNE, is used for visualize different embeddings in two dimensions.

FIG. 8 shows the 2-dimensional visualization of the domain aspect embeddings learned by the neural network. It shows the clustering of the news domains which are known to produce reliable news compared to a cluster of news domains notorious for producing fake news. It is noticed that the domain embeddings clearly separate trustworthy domains like 'washingtonpost.com', 'nytimes.com', etc. from non-trustworthy domains like 'inforwars.com' and 'dailycaller.com'. This is a clear indication that the learned embedding are good predictors of false news.

FIG. 9 shows the 2-dimensional visualization of the author aspect embeddings learned by the neural network. It shows the clustering of authors who have made similar fraction of false claims together, i.e. authors who made high number of false claims are placed closer with other authors with similar false claim ratio. t-SNE is used for visualize author embeddings in lower dimensional space. Only two dimensions from t-SNE with tuned parameters are used for the plot. The fraction of false claims associated with each author using grey-scale gradient. As can be seen in the plot the authors having a higher number of false claims are clearly separated from authors having a lower number of false claims. It is also interesting to notice the formation of a third cluster, which is related to the authors, who have almost equal number of false claims and true claims. It is also interesting to notice that people of similar ideology like 'Obama', 'Hillary', and 'Sanders' are closer in embedding space. This is evident by the visualization that the author based attention distinguish very effectively between the authors with less connotation of false claims and the authors with high connotation of false claims, which in-turn helps in deciding the credibility of claims.

FIG. 10 shows the 2-dimensional visualization of the subject aspect embeddings learned by the neural network. In this visualization we can notice that the controversial topics such as immigration and climate change are clustered closer together. Similarly, it is plotted two dimensions from t-SNE with tuned parameters to visualize the subject embeddings. It can be observed in the plot that the subjects with low and high false claims ratios are separated clearly into clusters. Due to the coarser granularity of the subjects, the separation is not as pronounced in author embeddings. Topics like 'Climate change' and 'Health care' have very high percentage of false claims and are closer in the two-dimensional space, while 'Federal law' having very low associated false claims is far away from them.

As an embodiment, a technique to extract evidence snippet supporting or refuting the claim from documents using attention weights at both the word and sentence level from all three models.

The neural network performing the method S1000 may also be configured to present the result of the method. The method may comprise an extracting process, S1500 for extracting and providing supporting or disproving evidence, text snippets, to a user:

S1500:—Extracting automatically supporting or disproving evidence by means of attention weights from the different latent aspect embeddings.

The step of extracting, S1500, supporting or disproving evidence may further comprise the step of:

S1510:—Summarizing and presenting the supporting or disproving evidence to a user.

For each word in each sentence of document $d_i$, the neural network is configured to calculate the average of attention weights is computed given by all three models and giving overall attention weight for that word. The average of overall attention weights are computed for all words in a sentence and this value is added to the average of sentence level attention weights for the same sentence from all three models and this value is stored to a list S. Indices of top K values in S sorted using argsort and the corresponding sentence indices are imported from document $d_i$. The result is presented to a user in decoded format enabling the user to check the result.

The proposed architecture is an improved tool to be used by professional journalists and fact checkers. The proposed model may be added as a browser extension which can be useful for general public for doing fact checking themselves for the social good.

In table 1 and in table 2, see below, are illustrated examples of attention visualization of the presented method and extracting process.

Table 1 is presenting a comparison example of the presented method evidence extraction to DeClarE for the claim 'U.S. is most highly taxed nation in the world'.

Table 2 is presenting a comparison example of the presented method evidence extraction to DeClarE for the claim 'There is substantial evidence of voter fraud'.

Tables 1 and 2 visualize the attention weights for two anecdotal examples (claim and document pairs), both at the word and sentence level for all three models and compare with state-of-the-art DeClarE model. The depth of the grey scale in rectangular boxes next to each sentence, represents the distribution of attention weights at the sentence level. Similarly, depth of the grey scale of highlights of the words represents the distribution of attention weights at the word level. For all the three models only top 4 sentences in Table 1 and top 2 sentences in Table 2 based on both word and sentence level attention weights are shown. As in each of the three models both claim and document text on top of aspect attributes are used to compute attention. Some common trends are therefore achieved in both word level and sentence level attention for all three models. Due to usage of different aspect attributes, namely subject, author and domain, in different models for attention computation, very interesting and relevant words and sentences selected in all three aspects are obtained, which is not possible otherwise.

As can be seen in Table 1, (a), for a claim related to Donald Trump that "U.S. is most highly taxed nation in the world", the model is applied to detect if it's true or false. A document extracted from the web is used for which domain is "independent.co.in", author is "Donald Trump" and subject is "Taxes". In author model, it is obvious that in Table 1, (a), first row, author based attention is able to capture words like "below Germany", "below the UK" and "Congressional Budget" other than claim oriented words like "US" and "Taxed", etc, as these words are highly correlated with the author "Donald Trump" as "Germany", 'UK' and 'Congressional' are some of the frequent words used by 'Donald Trump' or can be found in the articles related to him.

In similar fashion, in domain model in Table 1, (a), second row, domain based attention is able to capture words 'grossly inaccurate' and 'falsehood' and in Table 2, (a), second row, words like 'glaringly empty' and 'passingly rare', which are otherwise not possible to get attended with just claim only attention. As many articles from the same domain might be written by the same columnist or journalist and hence domain attention tries to capture their writing style and usage of specific phrases or words.

In case of subject model in Table 1, (a), third row, subject based attention learns to attend words and sentences which are related to the subject. As can be seen, 'Taxes' as subject captures words 'over-taxed' and 'income tax', etc, bur also at the sentences level, it is able to capture very interesting sentences like sentence number 2. In case of DeClarE model however, the model is unable to attend the most important words and sentences except few, like in sentence number 4, though it attends words like 'highly taxed nation', etc, but fails to attend the word 'falsehood', as is evident in Table 1, (b). As Declare model does not have sentence level attention, it is therefore not able to use the evidence provided by sentence 4 to decide the appropriate label.

Finally, it is illustrated a snippet extracted by the evidence extraction algorithm in Table 1, (a), fourth row and Table 2, (a), fourth row. The value of K is 5 in Table 1, (a), and 2 in in Table 2, (a), which means snippet contains top 5 sentences and top 2 sentences based on the evidence extraction method. It is clear and apparent that such a sentence extraction technique can be really effective in case of extractive text summarization tasks.

The invention may be implemented in digital electronically circuitry, or in computer hardware, firmware, software, or in combinations of them.

Figure 11:
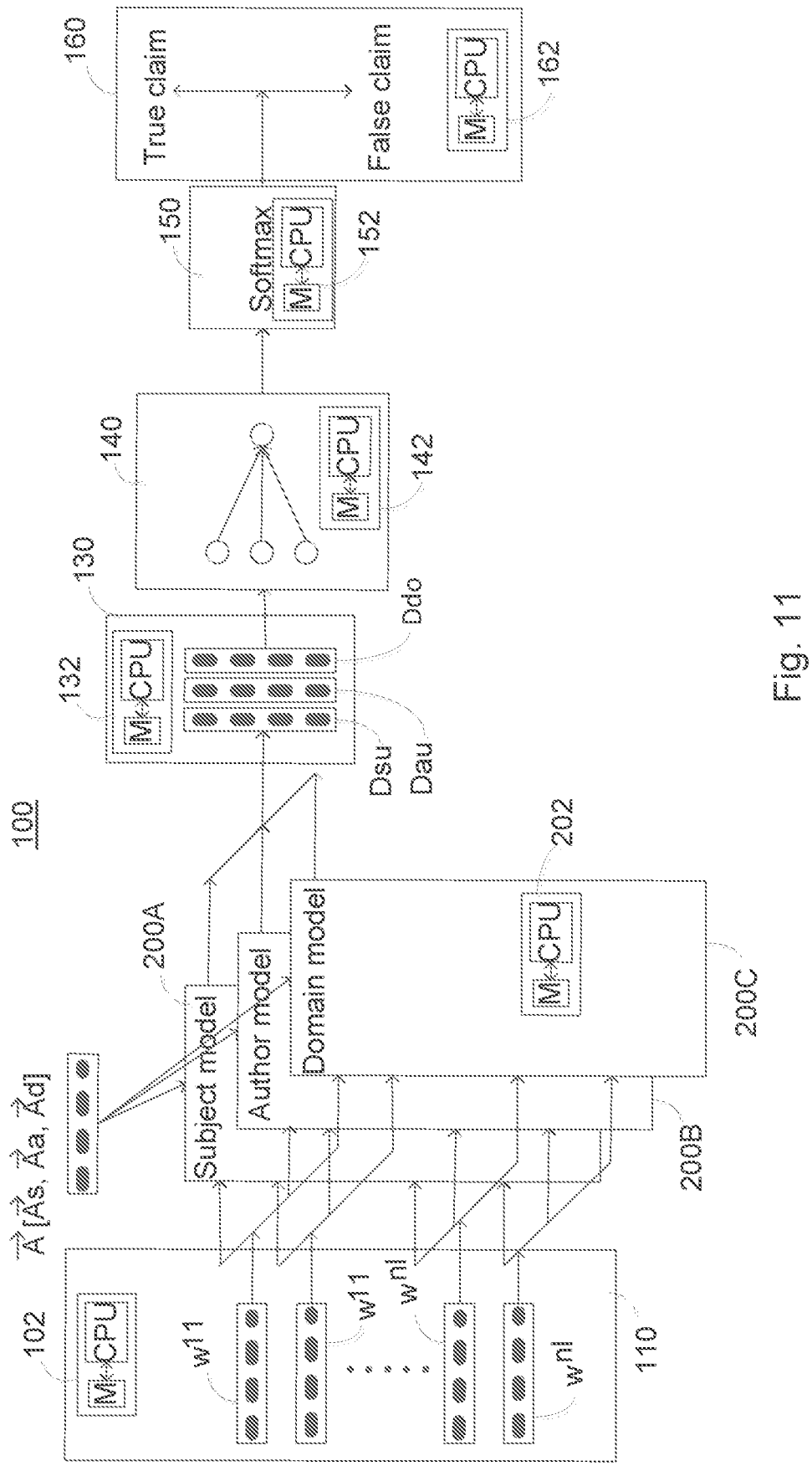
FIG. 11 is a block diagram of a high-level attention architecture of the attention neural network corresponding to FIG. 6.

FIG. 11 is illustrating a high-level attention architecture of the attention neural network, which is similar to the neural network illustrated in FIG. 6 and described above with reference to FIG. 6. As described with reference to FIG. 6, the high-level attention architecture of the attention neural network comprises a number of function blocks 110, 200A, 200B, 200C, 130, 140, 150 and 160. As illustrated in the example of FIG. 11, each of said function blocks may be implemented by and/or controlled by one or more data processors comprising CPUs (Central Processor Units) co-operating with one or more computer data memory or data storage device M storing necessary computer software and input/output data for running the data processors. The embedding layer block 110 comprises a data processor 112, each of the model blocks 200A, 200B, 200C comprises a data processor 202 (wherein only the data processor 202 of the domain model 200C is illustrated), the concatenating layer block 130 comprises data processor 132, the noisy-or gate 140 comprises data processor 142, the soft layer block 150 comprises data processor 152, and, finally, the classifying block 160 comprise a data processor 162. It should be understood that the data processors is configured to cooperate with data processors of other blocks in the neural network 100, at least a data processor should be able to communicate with its closest neighbour block data processor, both upstream or downstream.

In another example, some of the blocks of the neural network 100 may share one data processor in different block clusters. An example of such a block cluster data processor is the data processor 202 of the model block 200A. In FIG.

Figure 12:
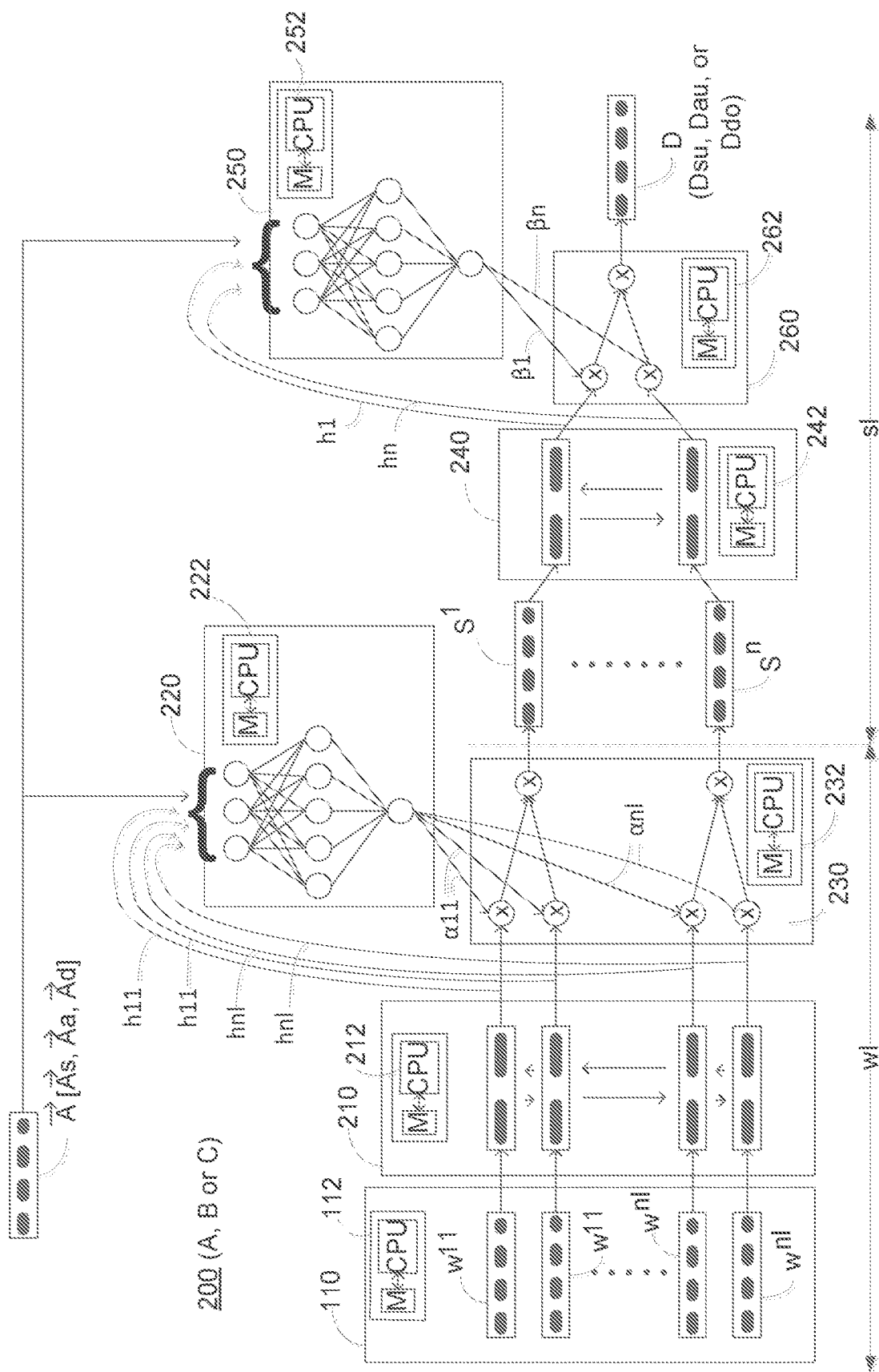
FIG. 12 is a block diagram of an attention mechanism of a latent aspect model of the high-level architecture corresponding to FIG. 7.

12, the blocks of model block 200 are described and illustrated. In the example of FIG. 12, each block has its own data processor. In FIG. 11, said blocks share one data processor 202.

In further one example all blocks of the neural network 100 may share one and the same data processor resource. Such a scenario could be said to be illustrated in FIG. 6, even though such a data processor resource is not explicitly illustrated in the drawing.

FIG. 12 is a block diagram of an attention mechanism of a latent aspect model of the model architecture corresponding to FIG. 7.

As described with reference to FIG. 7, the attention mechanism of a latent aspect model comprises a number of function blocks 210, 220, 230, 240, 250 and 260. As illustrated in the example of FIG. 12, each of said function blocks may be implemented by and/or controlled by one or more data processors comprising CPUs (Central Processor Units) co-operating with one or more computer data memory or data storage device M storing necessary computer software and input/output data for running the data processors. The Bi-LSTM layer block 210 comprises a data processor 212, the single layer neural network block 220 comprises a data processor 222, the multiplication layer block 230 comprises data processor 232, the second Bi-LSTM layer block 240 comprises a data processor 242, the second single layer neural network block 250 comprises a data processor 252, the soft layer block 250 comprises data processor 252, and, finally, the second multiplication layer block 260 comprises data processor 262. It should be understood that the data processors is configured to cooperate with data processors of other blocks in the latent aspect model 200, at least a data processor should be able to communicate with its closest neighbour block data processor, both upstream or downstream.

In one not illustrated example, some of the blocks in the latent aspect model 200 may share one data processor in different block clusters.

In further one example all blocks in the latent aspect model 200 may share one and the same data processor resource. Such a scenario is illustrated in FIG. 11, wherein data processor 202 is common for the blocks of the latent aspect model 200.

Apparatus of the invention may be implemented in a computer program product tangibly embodied in a machine readable storage device M for execution by a programmable data processor CPU and method steps of the invention may be performed by a programmable processor executing a program of instructions to perform functions of the invention by operating on input data and generating output. A program comprises computer software instructions.

The invention may advantageously be implemented in one or more computer programs that are executable on a programmable system including at least one programmable processor CPU coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a data processor CPU will receive instructions and data from a read-only memory and/or a random access memory M. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially designed ASICs (Application Specific Integrated Circuits).

A number of examples and embodiments of the present invention have been described. It will be understood that various modifications may be made without departing from the scope of the claims. Therefore, other implementations are within the scope of the following claims defining the invention.

The invention claimed is:

1. A method for automatically learning embeddings for one or more latent aspects of textual claims and documents constituting claim document pairs $\{c_i, d_i\}$ performed in an attention neural network comprising one or more latent aspect models for guiding an attention mechanism of the said neural network, the method comprising:

inserting a claim document pair $\{c_i, d_i\}$, in each of the latent aspect models and a latent aspect vector ($\vec{A}$) to select sentences to form document representations (D) for each respective latent aspect of the latent aspect vector ($\vec{A}$);

concatenating the document representations (D) to establish an overall document representation ($D_{all}$);

calculating a class probability distribution ($P_{bin}$) by means of the overall document representation ($D_{all}$); and classifying the claim $c_i$ of document $d_i$ as true or false using the class probability ($P_{bin}$) distribution ($P_{bin}$);

wherein said attention neural network comprises an input layer in terms of the claim document pair $\{c_i, d_i\}$, comprising pre-trained words ($w^{11}, w^{11}, \ldots, w^{nl}, w^{nl}$) to provide for each claim and document pair a concatenated word embeddings sequence, and each of the latent aspect models is configured to receive a claim document pair $\{c_i, d_i\}$ and the latent aspect vector ($\vec{A}$) comprising respective latent aspects, and wherein inserting a claim document pair $\{c_i, d_i\}$, in each of the latent aspect models and a latent aspect vector ($\vec{A}$) to select sentences to form document representations (D) for each respective latent aspect of the latent aspect vector ($\vec{A}$) comprises:

encoding the concatenated claim document pair $\{c_i, d_i\}$ word embeddings sequence by means of a first bidirectional long short term memory ("LSTM") layer for training the hidden states of the neural network;

computing a first set of values of attention weights ($\alpha_{11}, \ldots, \alpha_{nl}$) using the encoded hidden states of the claim document pair $\{c_i, d_i\}$ and latent aspect vector ($\vec{A}$)_by using a first single layer neural network with tanh activation;

multiplying the first set of values of attention weights ($\alpha_{11}, \ldots, \alpha_{nl}$) and the corresponding encoded hidden states of the claim document pair $\{c_i, d_i\}$ to select significant words to form sentence representations ($S^1, \ldots, S^n$);

encoding said sentence representations ($S^1, \ldots, S^n$) by means of a second bidirectional LSTM layer for providing encoded hidden states of the sentence representations ($S^1, \ldots, S^n$) of the claim document pair $\{c_i, d_i\}$;

computing a second set of values of attention weights ($\beta_1, \ldots, \beta_n$) using the encoded hidden states of bidirectional LSTM of sentences ($S^1, \ldots, S^n$) of the claim document pair $\{c_i, d_i\}$ and latent aspect vector ($\vec{A}$) by using a second single layer neural network with tanh activation; and multiplying the second set of values of attention weights ($\beta_1, \ldots, \beta_n$) and the corresponding encoded hidden states of the claim document pair $\{c_i, d_i\}$ to select sentences to form document representations (D) for each respective latent aspect of the latent aspect vector ($\vec{A}$).

2. The method according to claim 1, wherein the attention neural network is a deep hierarchical attention neural network.

3. The method according to claim 1, wherein the one or more latent aspect models involves at least three latent aspect models.

4. The method according to claim 1, wherein calculating further comprises:

calculating a non-linear transformation of the overall document representation ($D_{all}$) using tanh dense layer to transform it ($D_{all}$) to binary target space $D_{bin}$; $D_{bin}$ combining the losses of said one or more models by means of a noisy-or gate to provide combined losses as output;

calculating a class probability distribution ($P_{bin}$) by means of $D_{bin}$ and the combined losses using a softmax layer.

5. The method according to claim 4, wherein calculating $D_{bin}$, comprises calculating $D_{bin}$ as $D_{bin}=\tanh(W_{bin}D_{all}+b_{bin})$ where $W_{bin}$ and $b_{bin}$ are the weights matrix and bias for dense layer.

6. The method according to claim 4, wherein calculating $P_{bin}$ comprises calculating $P_{bin}$ as $P_{bin}=\text{softmax}(D_{bin})$ using the softmax layer.

7. The method according to claim 1, further comprising:

extracting automatically supporting or disproving evidence by means of attention weights from the different latent aspect embeddings;

summarizing and presenting the supporting or disproving evidence to a user.

8. An attention neural network for automatically learning embeddings for one or more latent aspects of textual claims and documents constituting claim document pairs $\{c_i, d_i\}$, the attention neural network comprising one or more latent aspect models for guiding an attention mechanism of the said neural network, wherein the attention neural network comprises one or more data processors configured to:

insert a claim document pair $\{c_i, d_i\}$, in each of the latent aspect models and a latent aspect vector ($\vec{A}$) to select sentences to form document representations (D) for each respective latent aspect of the latent aspect vector ($\vec{A}$);

concatenate the document representations (D) to establish an overall document representation ($D_{all}$);

calculate a class probability distribution ($P_{bin}$) by means of the overall document representation ($D_{all}$); and classify the claim $c_i$ of document $d_i$ as true or false using the class probability ($P_{bin}$) distribution ($P_{bin}$);

wherein said attention neural network comprises an input layer in terms of the claim document pair $\{c_i, d_i\}$, comprising pre-trained words ($w^{11}, w^{11}, \ldots, w^{n1}, w^{n1}$) to provide for each claim and document pair a concatenated word embeddings sequence, and each of the latent aspect models is configured to receive a claim document pair $\{c_i, d_i\}$ and the latent aspect vector ($\vec{A}$) comprising respective latent aspects, and wherein to insert a claim document pair $\{c_i, d_i\}$, in each of the latent aspect models and a latent aspect vector ($\vec{A}$) to select sentences to form document representations (D) for each respective latent aspect of the latent aspect vector ($\vec{A}$), the one or more data processors are further configured to:

encode the concatenated claim document pair $\{c_i, d_i\}$ word embeddings sequence by means of a first bidirectional long short term memory ("LSTM") layer for training the hidden states of the neural network;

compute a first set of values of attention weights ($\alpha_{11}, \ldots, \alpha_{nl}$) using the encoded hidden states of the claim document pair $\{c_i, d_i\}$ and latent aspect vector ($\vec{A}$) by using a first single layer neural network with tanh activation;

multiply the first set of values of attention weights ($\alpha_{11}, \ldots, \alpha_{nl}$) and the corresponding encoded hidden states of the claim document pair $\{c_i, d_i\}$ to select significant words to form sentence representations ($S^1, \ldots, S^n$);

encode said sentence representations ($S^1, \ldots, S^n$) by means of a second bidirectional LSTM layer for providing encoded hidden states of the sentence representations ($S^1, \ldots, S^n$) of the claim document pair $\{c_i, d_i\}$;

compute a second set of values of attention weights ($\beta_1, \ldots, \beta_n$) using the encoded hidden states of bidirectional LSTM of sentences ($S^1, \ldots, S^n$) of the claim document pair $\{c_i, d_i\}$ and latent aspect vector ($\vec{A}$) by using a second single layer neural network with tanh activation; and multiply the second set of values of attention weights ($\beta_1, \ldots, \beta_n$) and the corresponding encoded hidden states of the claim document pair $\{c_i, d_i\}$ to select sentences to form document representations (D) for each respective latent aspect of the latent aspect vector ($\vec{A}$).

9. The attention neural network according to claim 8, wherein the attention neural network is a deep hierarchical attention neural network.

10. The attention neural network according to claim 8, wherein the one or more latent aspect models involves at least three latent aspect models.

11. The attention neural network according to claim 8, wherein the attention neural network further is configured to:

calculate a non-linear transformation of the overall document representation ($D_{all}$) using tanh dense layer to transform it to binary target $D_{bin}$ space, $D_{bin}$;

combine the losses of said one or more models by means of a noisy-or gate to provide combined losses as output;

calculate a class probability distribution ($P_{bin}$) by means of $D_{bin}$ and the combined losses using a softmax layer.

12. The attention neural network according to claim 11, when calculating $D_{bin}$ comprises calculating $D_{bin}$ as $D_{bin}=\tanh(W_{bin}D_{all}+b_{bin})$ where $W_{bin}$ and $b_{bin}$ are the weights matrix and bias for dense layer.

13. The attention neural network according to claim 11, when calculating $P_{bin}$ comprises calculating $P_{bin}$ as $P_{bin}$=softmax($D_{bin}$) using the softmax layer.

14. The attention neural network to claim 8, wherein the attention neural network further is configured to:
- extract automatically supporting or disproving evidence by means of attention weights from the different latent aspect embeddings;

summarize and present the supporting or disproving evidence to a user.

* * * * *